(12) United States Patent
Yamane

(10) Patent No.: US 9,590,939 B2
(45) Date of Patent: Mar. 7, 2017

(54) MAIL SERVER, MAIL TRANSMITTING/RECEIVING METHOD, AND MAIL TRANSMITTING/RECEIVING PROGRAM

(71) Applicant: Hisanori Yamane, Singapore (SG)

(72) Inventor: Hisanori Yamane, Singapore (SG)

(73) Assignee: Hisanori YAMANE, Singapore (SG)

( * ) Notice: Subject to any disclaimer, the term of this patent is extended or adjusted under 35 U.S.C. 154(b) by 98 days.

(21) Appl. No.: 14/441,485

(22) PCT Filed: May 13, 2014

(86) PCT No.: PCT/JP2014/002512
§ 371 (c)(1),
(2) Date: May 7, 2015

(87) PCT Pub. No.: WO2015/145490
PCT Pub. Date: Oct. 1, 2015

(65) Prior Publication Data
US 2016/0261540 A1    Sep. 8, 2016

(30) Foreign Application Priority Data

Mar. 25, 2014 (JP) ................................. 2014-062325

(51) Int. Cl.
*H04L 12/24* (2006.01)
*H04L 12/58* (2006.01)
(Continued)

(52) U.S. Cl.
CPC .............. *H04L 51/22* (2013.01); *G06F 13/00* (2013.01); *H04L 41/026* (2013.01); *H04L 51/18* (2013.01);
(Continued)

(58) Field of Classification Search
CPC .................................................. H04L 41/026
See application file for complete search history.

(56) References Cited

U.S. PATENT DOCUMENTS 6,601,088 B1 * 7/2003 Kelley ................. G06Q 10/107
709/206
2005/0044109 A1    2/2005 Nanba
(Continued)

FOREIGN PATENT DOCUMENTS

JP        10-293734 A     11/1998
JP        2002-373141 A   12/2002
(Continued)

OTHER PUBLICATIONS

Extended European Search Report for EP App No. 14854882.9 dated Feb. 4, 2016, 8 pgs.
(Continued)

*Primary Examiner* — Arvin Eskandarnia
(74) *Attorney, Agent, or Firm* — Procopio, Cory, Hargreaves & Savitch LLP

(57) ABSTRACT

By an email server, it becomes possible to perform a deletion process for an email transmitted by a sender according to sender's intention and thereby to delete the transmitted email based on that operation. An email deletion server (1) according to the present invention includes a deletion request information storage unit (1a) that stores identification information of an email and identification information of at least one receiver of that email, the email being requested to be deleted by a sender, and an email deletion processing unit (1D) that updates, for the email server, a process for deleting an email from a reception email area of the receiver based on the identification information of the email and the identification information of the receiver stored in the deletion request information storage unit (1a), the email being identified by the identification information of the email and the identification information of the receiver.

3 Claims, 10 Drawing Sheets

(51) Int. Cl.
 *G06F 13/00* (2006.01)
 *H04L 29/08* (2006.01)
(52) U.S. Cl.
 CPC ...... *H04L 67/1002* (2013.01); *H04L 67/1097* (2013.01)

(56) References Cited

U.S. PATENT DOCUMENTS

| | | |
|---|---|---|
| 2011/0289167 A1 | 11/2011 | Takahashi |
| 2013/0198300 A1* | 8/2013 | Briggman ............... H04L 51/34 709/206 |
| 2013/0218986 A1 | 8/2013 | Sobhani |

FOREIGN PATENT DOCUMENTS

| | | |
|---|---|---|
| JP | 2006-293841 A | 10/2006 |
| JP | 2008-243147 A | 10/2008 |
| JP | 2009-205580 A | 9/2009 |
| JP | 2009-223769 A | 10/2009 |
| JP | 2012-079158 A | 4/2012 |
| WO | 2010-064536 A | 6/2010 |

OTHER PUBLICATIONS

International Search Report for PCT/JP2014/002512, dated Aug. 12, 2014.

* cited by examiner

MAIL SERVER, MAIL TRANSMITTING/RECEIVING METHOD, AND MAIL TRANSMITTING/RECEIVING PROGRAM

TECHNICAL FIELD

The present invention relates to an email server, an email transmitting/receiving method, and an email transmitting/receiving program. For example, the present invention relates to an email server, an email transmitting/receiving method, and an email transmitting/receiving program in which a transmitted email is deleted by an operation performed by its sender.

BACKGROUND ART

In recent years, electronic mails (hereinafter called "emails") have been becoming more important as information transmission means and have come into widespread use. Further, there is a tendency that the total number of transmitted emails is increasing year after year as the use of emails has become widespread. There are a lot of transmitted emails that are unnecessary for receivers or emails that become unnecessary when a certain period has elapsed after the emails are transmitted or after receivers have viewed the emails. Receivers divide these transmitted emails into unnecessary emails and necessary emails and delete the unnecessary emails by using deletion settings in email software or on web-browsers. As an example of a method for deleting a received email, Patent Literature 1 discloses an email deletion reservation system. This email deletion reservation system is a certain email software or the like installed in a terminal possessed by a receiver, and includes deletion reservation setting means for associating a specific deletion reservation date/time with a certain email according to an input setting by the receiver, and email deletion means for comparing the present date/time with that deletion reservation date/time and deleting that specific email at the deletion reservation date/time.

CITATION LIST

Patent Literature

Patent Literature 1: Japanese Unexamined Patent Application Publication No. 2009-205580

SUMMARY OF INVENTION

Technical Problem

Among emails transmitted by senders, there are, for example, emails that become unnecessary after the receivers have viewed them such as already-known matters, and emails that become unnecessary for the senders after a certain period has elapsed or after a specific date/time. That is, there are cases where senders want to delete their transmitted emails for senders' own convenience. However, in the email deletion reservation system disclosed in Patent Literature 1, the deletion reservation process is performed by the certain email software or the like installed in the terminal possessed by the receiver. Therefore, there is a problem that transmitted emails cannot be deleted according to the senders' intentions.

An object is to make it possible, by an email server, an email transmitting/receiving method, and an email transmitting/receiving program according to the present invention, to perform a deletion process for an email transmitted by a sender according to sender's intention and thereby to delete the transmitted email based on that operation.

Solution to Problem

An email deletion server according to an aspect includes: a deletion request information storage unit that stores identification information of an email and identification information of at least one receiver of that email, the email being requested to be deleted by a sender; and an email deletion processing unit that updates, for the email server, a process for deleting an email from a reception email area of the receiver based on the identification information of the email and the identification information of the receiver stored in the deletion request information storage unit, the email being identified by the identification information of the email and the identification information of the receiver.

A deletion method according to an aspect includes: storing identification information of an email and identification information of at least one receiver of that email, the email being requested to be deleted by a sender; and updating, for the email server, a process for deleting an email from a reception email area of the receiver based on the identification information of the email and the identification information of the receiver stored in the deletion request information storage unit, the email being identified by the identification information of the email and the identification information of the receiver.

A deletion program according to an aspect causes a computer to execute a process including: storing identification information of an email and identification information of at least one receiver of that email, the email being requested to be deleted by a sender; and updating, for the email server, a process for deleting an email from a reception email area of the receiver based on the identification information of the email and the identification information of the receiver stored in the deletion request information storage unit, the email being identified by the identification information of the email and the identification information of the receiver.

Advantageous Effects of Invention

According to an email server, an email transmitting/receiving method, and an email transmitting/receiving program in accordance with the present invention, it is possible to perform a deletion process for an email transmitted by a sender according to sender's intention and thereby to delete the transmitted email based on that operation.

DESCRIPTION OF EMBODIMENTS

Exemplary embodiments of an email server, an email transmitting/receiving method, and an email transmitting/receiving program according to the present invention are explained hereinafter with reference to the drawings.

First Exemplary Embodiment

Figure 1:
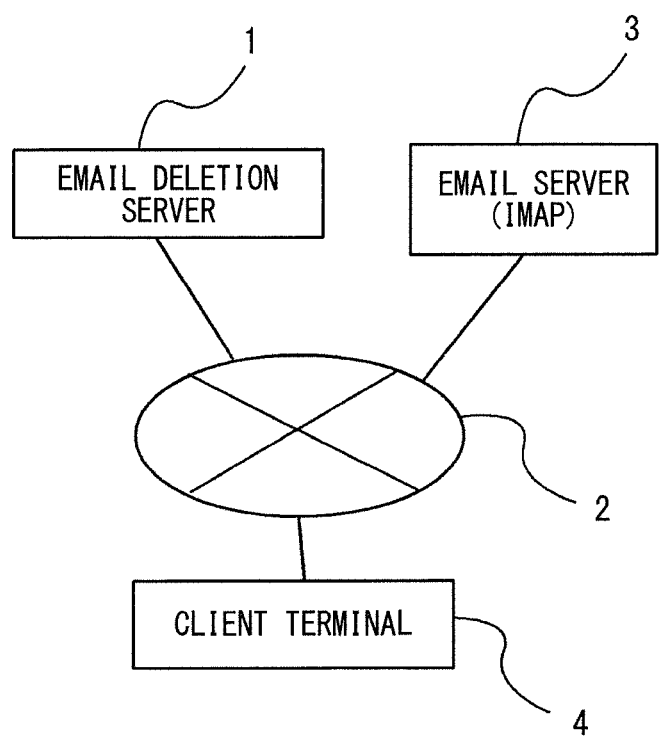
FIG. 1 shows a system configuration of an email deletion server according to a first exemplary embodiment.

As shown in FIG. 1, an email deletion server 1 is a server that connects to an email server 3 through a communication network 2 such as the Internet and thereby manages emails transmitted/received in a client terminal 4, and deletes transmitted emails from the client terminal 4 according to sender's intention. The system configuration in which the email deletion server 1 is connected is merely an example. For example, the email deletion server 1 may be connected to the email server 3 without the communication network 2 interposed therebetween instead of using the above-described configuration. Further, the email deletion server 1 may serve as a proxy server and hence the email deletion server 1 may be connected between the communication network 2 and the email server 3. Further, the email deletion server 1 may be incorporated into the email server 3.

The email deletion server 1 makes a list of all the emails transmitted/received in the client terminal 4, and stores and manages those emails. Each of the transmitted/received emails needs to be identified in the list, but the main bodies of those emails. In contrast to this, all the transmitted/received emails including their main bodies are stored in the email server 3.

The email server 3 is, for example, an IMAP (Internet Message Access Protocol) server. In general, all the transmitted/received emails are stored in the email server 3. Some of the stored emails are deleted when a user performs an operation for deleting them. The only requirement for the email server 3 is that all the transmitted/received emails be stored therein. That is, servers other than the IMAP server may be used. The clients that transmit/receive emails may be specific certified users. The client terminal 4 is a terminal that is used by a sender or a receiver and connected to the communication network 2.

Next, an outline of a configuration of the email deletion server 1 is explained.

Figure 2:
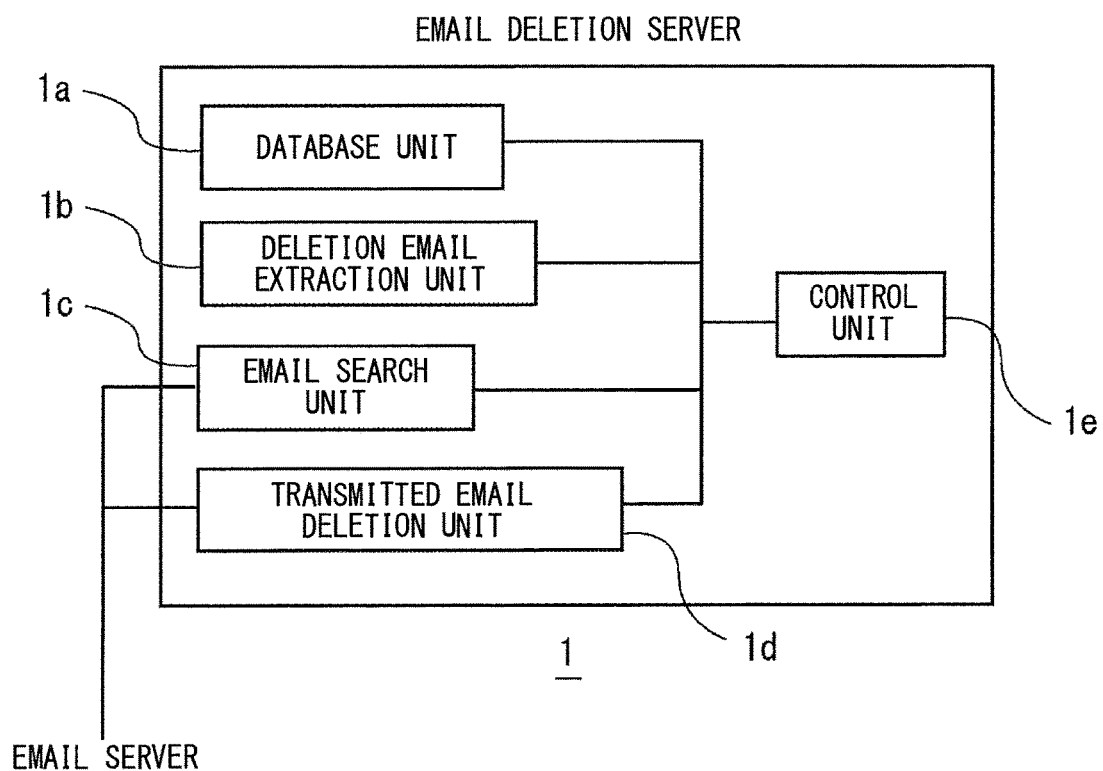
FIG. 2 shows a configuration of an email deletion server.
Figure 3:
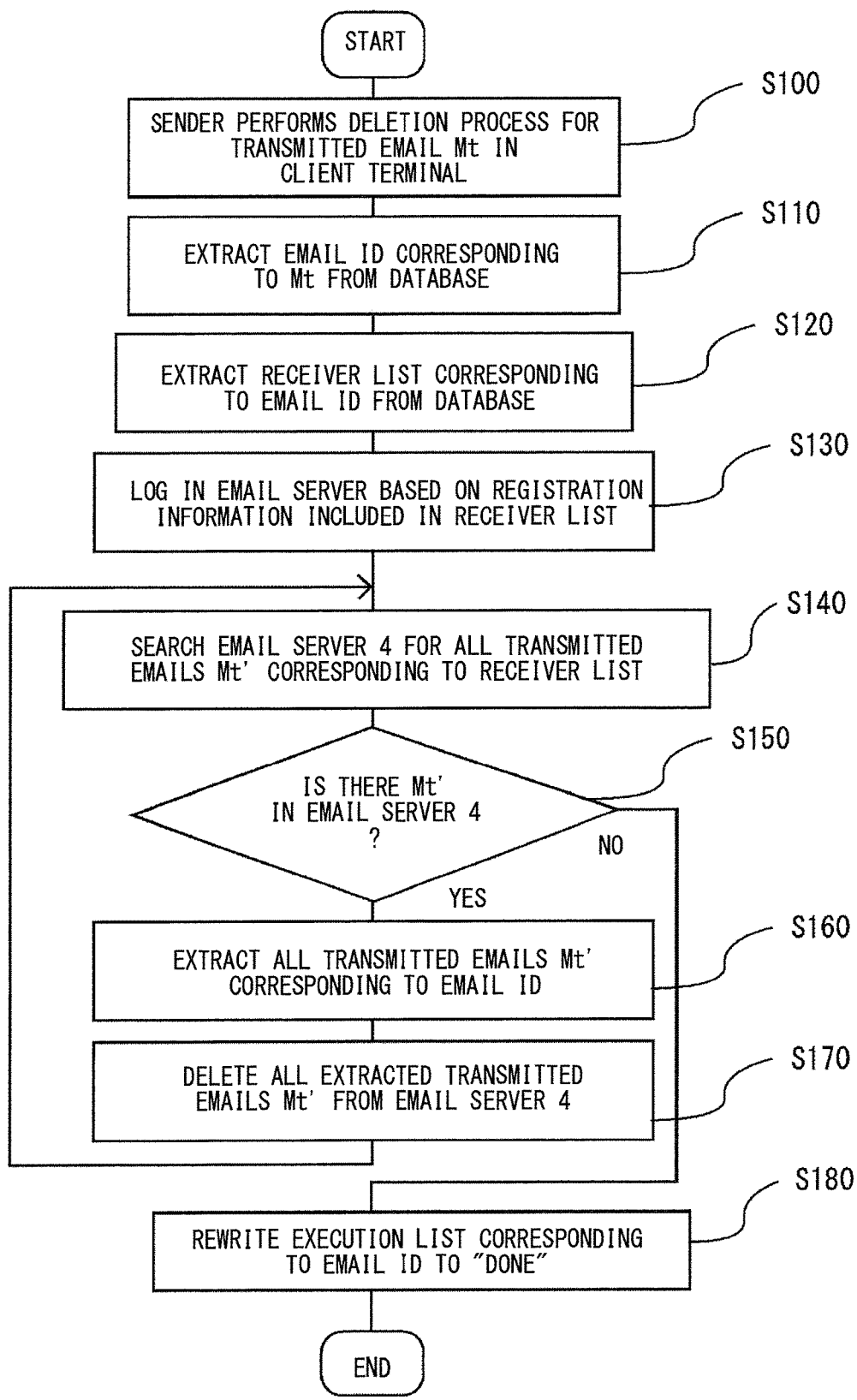
FIG. 3 is a flowchart showing processes performed by an email deletion server.

As shown in FIG. 2, the email deletion server 1 includes a database unit 1*a*. The database unit 1*a* may be disposed inside the email deletion server 1 or may be externally connected to the email deletion server 1. The database unit 1*a* records a list of emails transmitted/received by the client terminal and reception users who have received those emails. This list stored in the database unit 1*a* is periodically updated.

As shown in Table 1, in this list, for example, ID (identification information) corresponding to transmitted/received emails, senders who have transmitted the emails corresponding to the ID, identification information of receivers who have received the emails, deletion processes that the senders have performed for the emails, and information about whether or not the deletion of transmitted emails from the email server 3 was performed. The deletion process means, for example, a state where a sender moves a transmitted email to a deletion folder or a sender performs an operation for deleting a transmitted email. When a sender performs the above-described deletion process in the client terminal 4, the list stored in the database unit (deletion request information storage unit) 1*a* is updated.

TABLE 1

| Mail ID | Sender | Receiver | Deletion process | Execution |
|---------|--------|----------|------------------|-----------|
| 1 | x1 | y1, y2, y3 | Delete | Not yet |
| 2 | x2 | y5, y6 | Not | — |
| 3 | x1 | y1, y5, y8 | Delete | Not yet |
| 4 | x3 | y2, y9, y10, y11 | Delete | Done |

As an example of a method for updating the list stored in the database unit 1*a*, as shown in Table, 1, the email deletion server 1 monitors an operation performed by a sender x1 for a deletion process of an email ID=1 by referring to an email folder of the sender x1 in the email server 3, and updates the list when a change is extracted (or detected). Then, the email deletion server 1 monitors a deletion process of the email ID=1 possessed by receivers y1, y2 and y3 for the deletion process of the email ID=1 by referring to an email folder of the receivers y1, y2 and y3, and updates the list when a change is extracted (or detected). These processes for monitoring and updating the list may be implemented, for example, by connecting the email deletion server 1 between the client terminal 4 of a sender and the email server 3. Alternatively, they may be implemented by incorporating a dedicated module into the client terminal 4 of a sender.

As shown in FIG. 2, a deletion email extraction unit 1*b* periodically refers to the above-described list and extracts, from the list, an email ID corresponding to a transmitted email Mt for which its sender has performed a deletion process by using the client terminal and a list of receivers corresponding to reception users who have received that transmitted email Mt. For example, the deletion email extraction unit 1*b* extracts receivers y1, y2 and y3 corresponding to the email ID=1 of the email Mt, for which the deletion process has been performed, as a receiver list. The deletion email extraction unit 1*b* also performs a similar process for an email ID=3 and thereby extracts a receiver list. The deletion email extraction unit 1*b* performs no process for an email ID=4 because a deletion process has already finished for the email ID=4 as explained later. The receiver list includes information on registration of receivers to the email server 3. The registration information is, for example, log-in information.

An email search unit 1*c* logs in the email server 3 based on the registration information included in the receiver list and searches the email server 3 for all the transmitted emails Mt' corresponding to the extracted receiver list based on the receiver list. As stated above, all the transmitted/received emails are stored in the email server 3. The email search unit 1*c* extracts, from among all the emails, all the transmitted emails Mt' corresponding to the email ID, corresponding to the receiver list.

A transmitted email deletion unit 1*d* deletes all the extracted transmitted emails Mt' from the email server 3. The email search unit 1*c* and the transmitted email deletion unit 1*d* repeat the above-described series of processes until all the transmitted emails Mt' extracted from the email server 3 have been deleted.

A control unit 1*e* corresponds to, for example, a CPU (Central Processing Unit) of a PC (personal computer). The control unit 1e operates according to an OS (Operating System) set up in a hard disk drive and an installed program(s) and performs the above-described processes of the database unit 1a, the deletion email extraction unit 1b, the email search unit 1c, and the transmitted email deletion unit 1d. When the above-described deletion of the extracted transmitted emails has been finished, the control unit 1e rewrites a list of executions corresponding to the email ID=1, 3 (see Table 1) recorded in the database unit 1a to "done". Further, when the above-described deletion process is performed in the client terminal 4 by a sender, the control unit 1e updates the list stored in the database unit 1a. The above-described deletion email extraction unit 1b, the email search unit 1c, and the transmitted email deletion unit 1d constitute an email deletion processing unit 1D.

That is, the email deletion processing unit 1D updates, for the email server 3, a process for deleting an email, which is identified by the identification information of the email stored in the database unit 1a and the identification information of a receiver, from the reception email area of the receiver based on the identification information of the email and the identification information of the receiver. Further, the email deletion processing unit 1D updates, for the email server 3, a process for deleting an email, the deletion of which has been requested, from the reception email area of a receiver based on a deletion process performed for the email by a sender after a certain period has elapsed.

Further, the deletion request processing unit 1D updates, for the email server 3, a process for deleting an email, the deletion of which has been requested, from the reception email area of a receiver based on a deletion process performed for the email by a sender after a certain period has elapsed.

Next, processes performed by the email deletion server 1 are explained with reference to the drawings.

A sender puts a transmitted email Mt, which the sender has transmitted, into a deletion folder in the client terminal 4, or performs a deletion process for deleting the transmitted email Mt (S100). This deletion process is recorded in a list stored in the database unit 1a. The deletion email extraction unit 1b periodically refers to the list and extracts the ID of the transmitted email Mt, for which the deletion process has been performed, from the list (S110). After that, the deletion email extraction unit 1b extracts a list of receivers corresponding to reception users who have received that transmitted email Mt (S120). After that, the email search unit 1c logs in the email server 3 based on registration information included in the receiver list (S130.) After that, the email search unit 1c searches the email server 3 for all the transmitted emails Mt' corresponding to the extracted receiver list based on that receiver list (S140).

When a transmitted email(s) Mt' is found in the email server 3 (S150: Yes), the email search unit 1c extracts all the transmitted emails Mt corresponding to the email ID (S160). The transmitted email deletion unit 1d deletes all the extracted transmitted emails Mt' from the email server 3 (S170). After that, the process is returned to the step S150. After the processes from the step S150 to S170 are repeated, when no transmitted email Mt' is found in the email server 3 (S150: No), a list of executions corresponding to the email ID recorded in the database unit 1a is rewritten to "done" (S180). After that, the above-described process is finished.

As described above, according to the email deletion server 1, it is possible to extract and delete all the received emails corresponding to the transmitted email from the email server 3 according to the intention of the sender who has transmitted the email. The email deletion server 1 can delete the email received by the receiver corresponding to the transmitted email in conjunction with the deletion process of the transmitted email performed by the sender without installing any special program in the terminal on the client side which transmits/receives emails.

Second Exemplary Embodiment

In the first exemplary embodiment, the email deletion server 1 determines a deletion process based on a state where the sender moves a transmitted email to a deletion folder or the sender performs an operation for deleting the transmitted email. In a second exemplary embodiment, an email deletion server 10 determines a deletion process based on a specific character string that the sender inserts into the "Subject" of an email transmitted by the sender. Further, the same symbols are used for the same parts as those of the first exemplary embodiment, and the same names are used for parts having the same functions as those of the first exemplary embodiment. Further, explanations of duplicated parts are omitted as appropriate.

Figure 4:
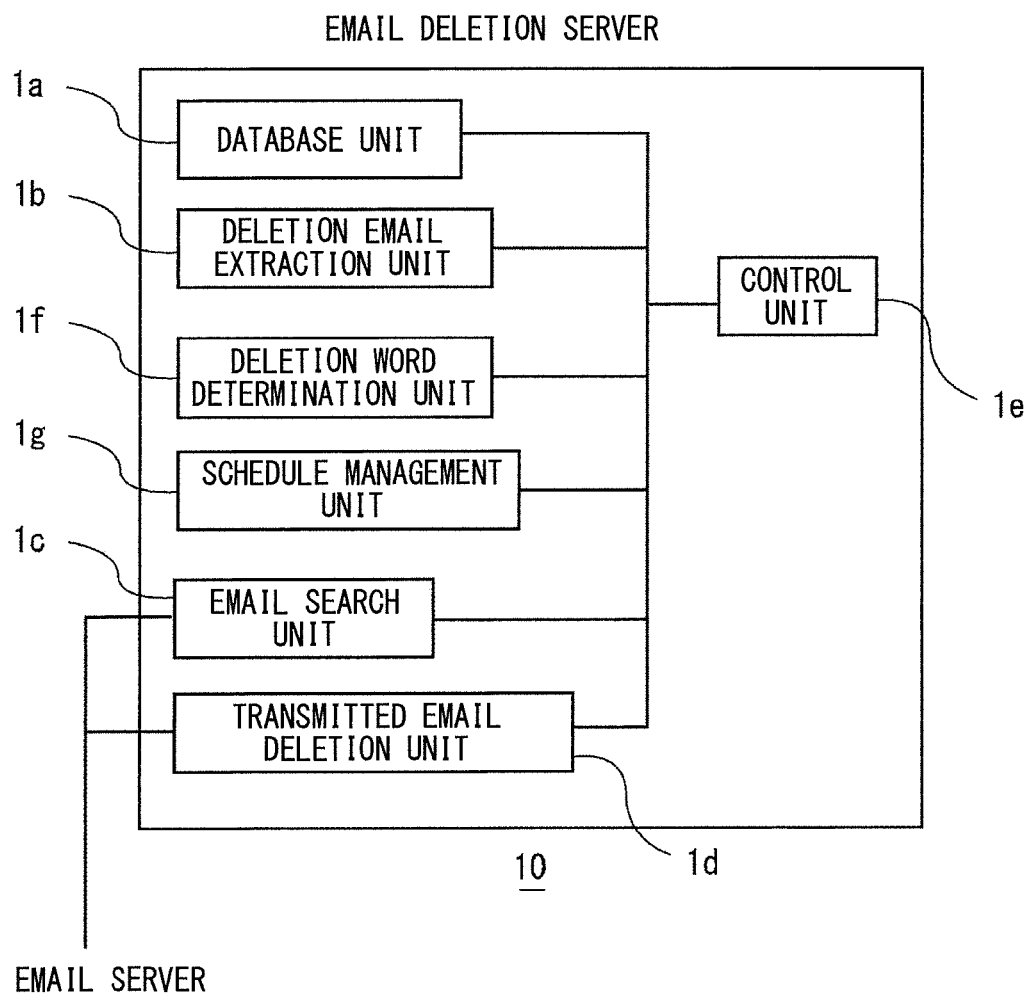
FIG. 4 shows a configuration of an email deletion server according to a second exemplary embodiment.

As shown in FIG. 4, in comparison to the email deletion server 1, the email deletion server 10 further includes a deletion word determination unit 1f and a schedule management unit 1g.

The deletion word determination unit 1f extracts a specific character string for indicating an intention of deletion that is put in the Subject section of an email by a sender when the email is transmitted. The specific character string is for indicating a deletion schedule. Examples of the specific character string include #del, #del1, and #del7. Note that, for example, #del is defined as that a transmitted email should be deleted when a certain time has elapsed after the transmitted email is viewed by a receiver and thereby becomes an already-read state. For example, #del1 is defined as that a transmitted email should be deleted one day after the transmission of the email. When a number is added to the character string, it is unnecessary to determine whether the email has been already read or not. For example, #del7 is defined as that a transmitted email should be deleted seven days after the transmission of the email. The specific character string may be inserted into the main body of an email. Alternatively, the specific character string may be written into the email header. As described above, a deletion schedule is generated based on a specific character string that is added by a sender in the email deletion server 1.

As shown in Table 2, when a transmitted email Mt1 to be deleted is extracted by the deletion word determination unit 1f, a schedule is created by recording the specific character string and a date/time at which the email should be deleted in the list stored in the database unit 1a. Whether or not the email has been already read by the receiver may be determined by the deletion email extraction unit 1b, and the database unit 1a may be updated according to the determination.

TABLE 2

| Mail ID | Sender | Receiver | Char. string | Execution date/time | Deletion process | Execution |
|---|---|---|---|---|---|---|
| 1 | x1 | y1, y2, y3 | #del | After being read | Delete | Not yet |
| 2 | x2 | y5, y6 | | | Not | — |
| 3 | x1 | y1, y5, y8 | #del1 | In one day | Delete | Not yet |
| 4 | x3 | y2, y9, y10, y11 | #del7 | In two days | Delete | Done |

The schedule management unit 1g (see FIG. 2) periodically checks the execution date/time of the list and whether or not the deletion has been already performed. Then, as a result of the comparison with the present time, when it is the date/time to delete the transmitted email to be deleted, the schedule management unit 1g notifies the deletion email extraction unit 1b about that. The above-described process may be implemented by installing dedicated email client software in the client terminal 4 of a sender and having the sender operate the installed email client software by using a dedicated UI (User Interface) for email deletion. As another method, the above-described process may be implemented by providing a Web-page for email deletion to a user and having the sender perform an operation on the Web-page. In this case, even when the sender does not perform an operation for adding a specific character string, a specific character string is automatically added in a transmitted email. Further, instead of adding a specific character string, a "deletion" instruction may be directly sent to the email deletion server 1.

In the email deletion server 10, the deletion email extraction unit 1b, the deletion word determination unit 1f, the schedule management unit 1g, the email search unit 1c, and the transmitted email deletion unit 1d constitute an email deletion processing unit 1D2. That is, the email deletion processing unit 1D2 generates a deletion schedule of an email at a specific date/time based on a specific character string in which a sender adds deletion of the email, deletion of which has been requested, in the content of the email, and updates, for the email server, a process for deleting the email from the reception email area of a receiver according to the generated deletion schedule.

Next, processes performed by the email deletion server 10 are explained with reference to the drawings.

Figure 5:
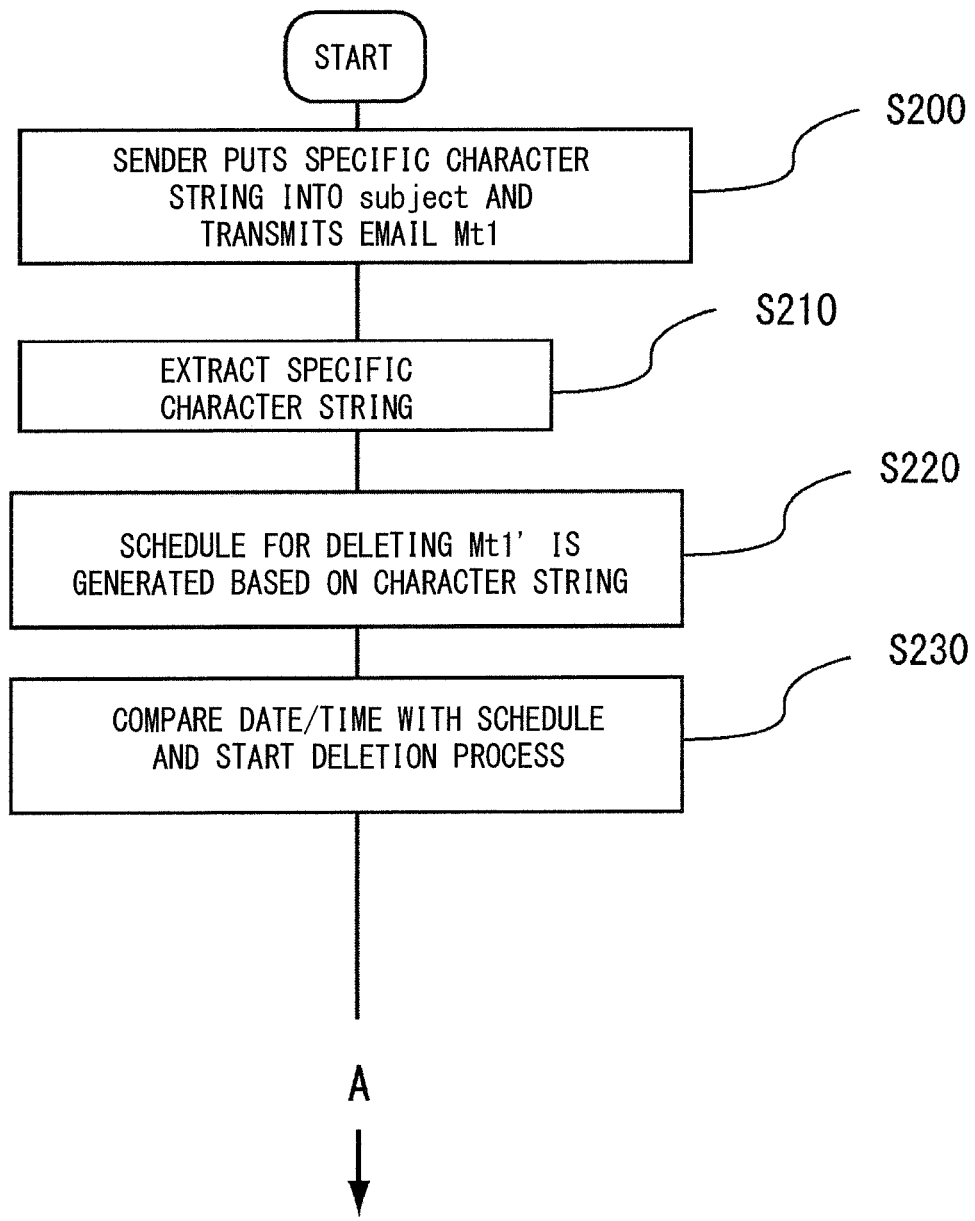
FIG. 5 is a flowchart showing processes performed by an email deletion server.
Figure 6:
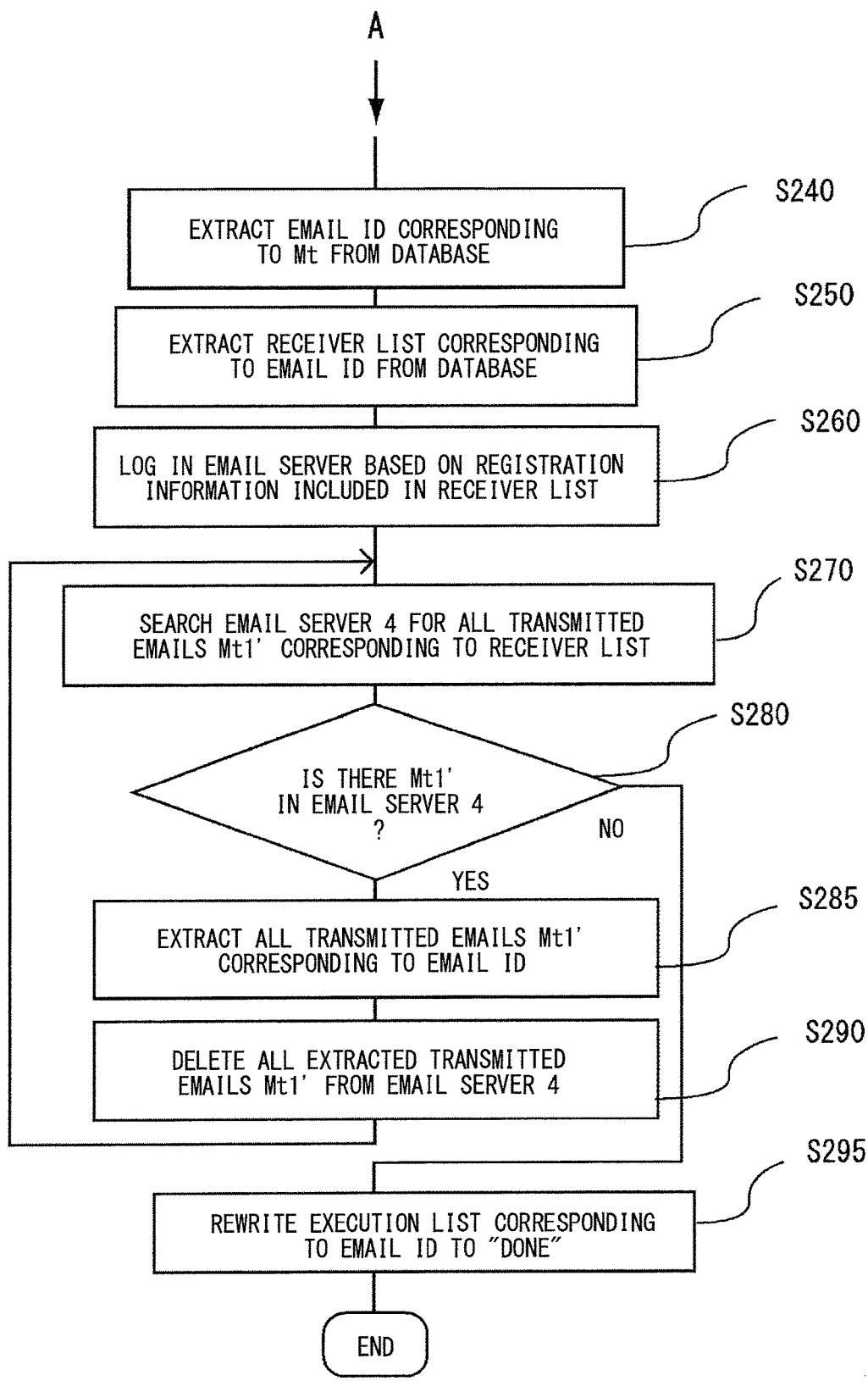
FIG. 6 is a flowchart showing processes performed by an email deletion server.

As shown in FIGS. 5 and 6, a sender inserts a specific character string indicating deletion into the Subject of an email to be transmitted and transmits the email (S200). The deletion word determination unit 1f extracts that specific character string and extracts the transmitted email Mt1 to be deleted (S210). A schedule is created by recoding the specific character string and the date/time at which the deletion is performed in the list of the email Mt1 stored in the database unit 1a (S220). The schedule management unit 1g periodically checks the execution date/time in the list and whether or not the deletion has been already performed. Then, when it is the date/time to delete the transmitted email to be deleted, the schedule management unit 1g notifies the deletion email extraction unit 1b about that and a deletion process is thereby started (S230). The subsequent processes from a step S240 to S295 are similar to those from the step S110 to S180 of the first exemplary embodiment.

As described above, according to the email deletion server 10, it is possible to delete an email received by a receiver corresponding to an email transmitted according to a schedule intended by a sender from the email server 3 by inserting a specific character string into the content of the email transmitted by the sender.

Third Exemplary Embodiment

In the second exemplary embodiment, a specific character string is used for the determination of a deletion process. In a third exemplary embodiment, an email deletion server 15 deletes all the emails that a sender has transmitted in exchanges of all the emails between specific users when a certain period has elapsed after the emails become already-read states. Further, the same symbols are used for the same parts as those of the first and second exemplary embodiments, and the same names are used for parts having the same functions as those of the first and second exemplary embodiments. Further, explanations of duplicated parts are omitted as appropriate.

Figure 7:
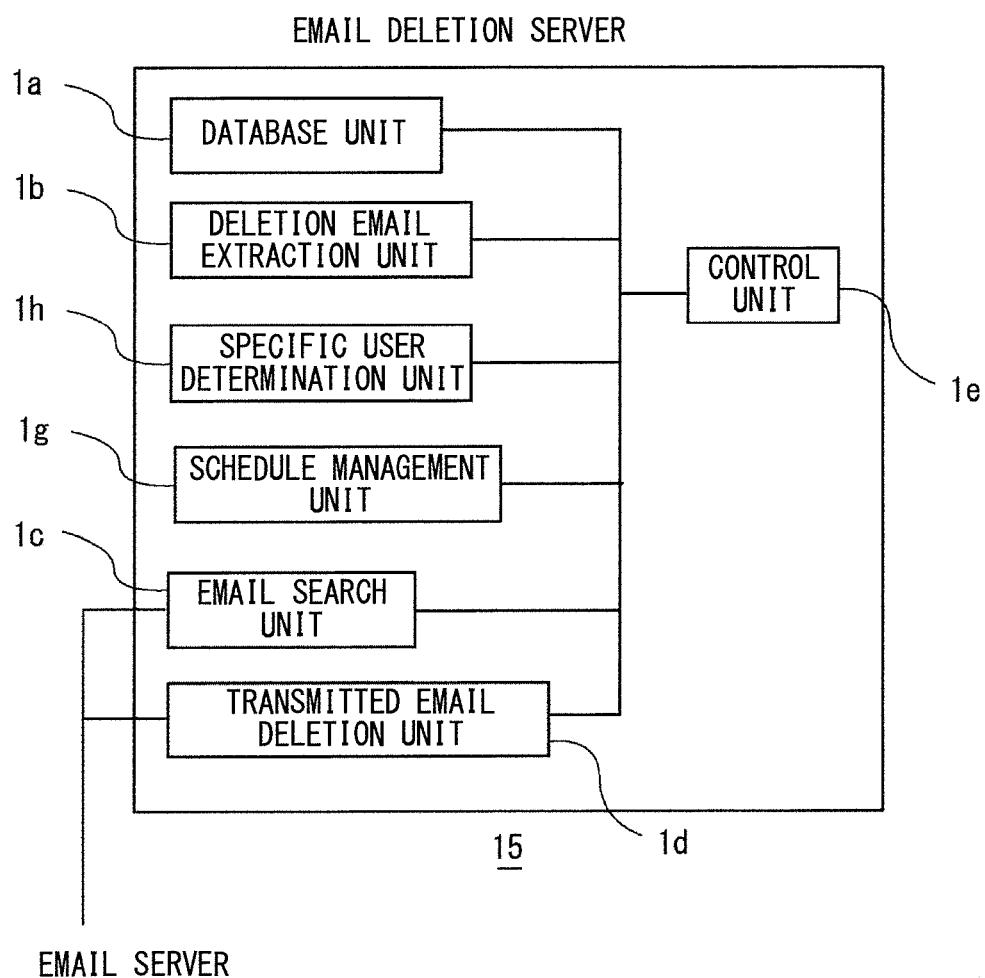
FIG. 7 shows a configuration of an email deletion server according to a third exemplary embodiment.
Figure 8:
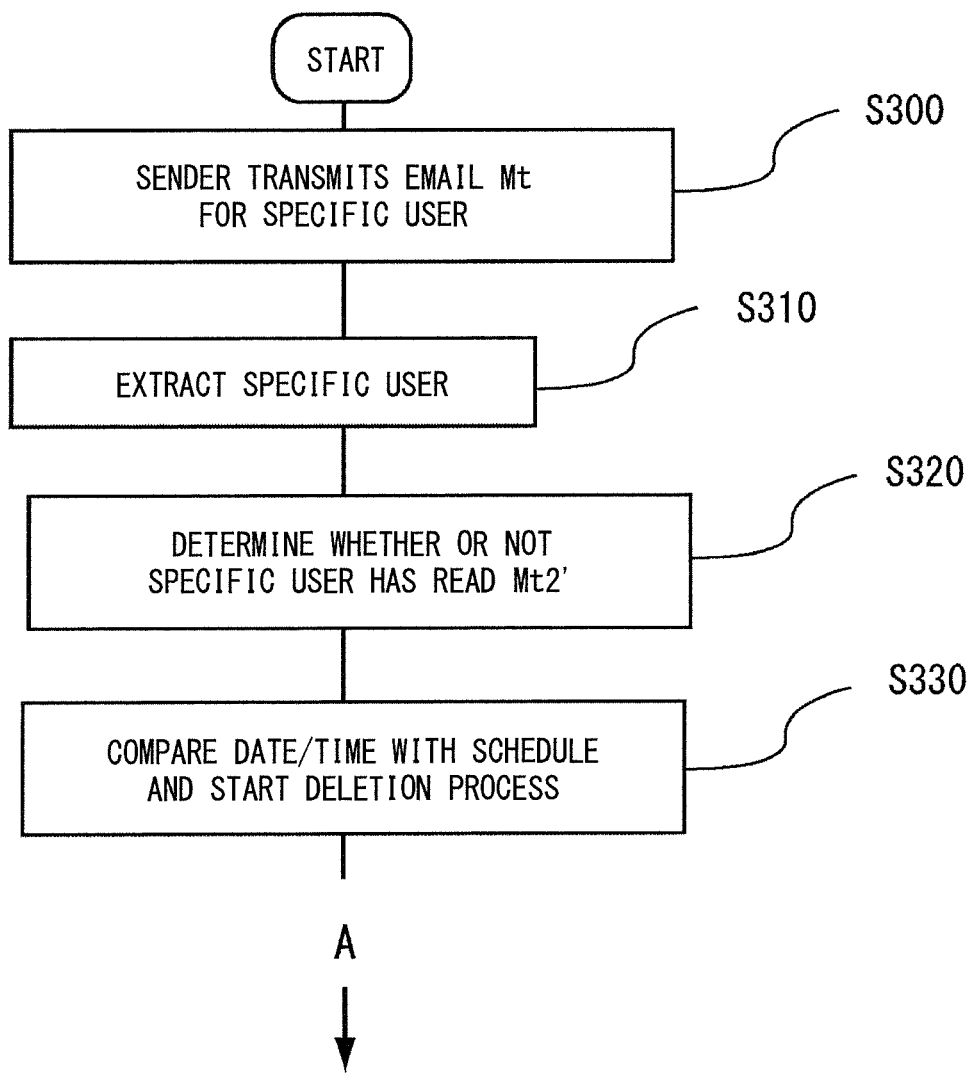
FIG. 8 is a flowchart showing processes performed by an email deletion server.

As shown in FIG. 7, in comparison to the email deletion server 10, the email deletion server 15 includes a specific user determination unit 1h instead of the deletion word determination unit 1f. In the email deletion server 15, the deletion email extraction unit 1b, the specific user determination unit 1h, the schedule management unit 1g, the email search unit 1c, and the transmitted email deletion unit 1d constitute an email deletion processing unit 1D3.

The specific user determination unit 1h determines whether or not the transmission destination of an email transmitted by a sender is a specific user specified by the sender. When a sender transmits an email to a specific user in the client terminal 4, the list stored in the database unit 1a is updated.

TABLE 3

| Mail ID | Sender | Specific user | Execution date/time | Deletion process | Execution |
|---|---|---|---|---|---|
| 1 | x1 | y1, y2, y3 | After being read | Delete | Not yet |
| 2 | x2 | y5, y6 | | Not | — |
| 3 | x1 | y1, y5, y8 | After being read | Delete | Not yet |
| 4 | x3 | y2, y9, y10, y11 | After being read | Delete | Done |

Table 3 is similar to Table 2 of the first exemplary embodiment except that the receiver list in Table 2 is replaced by a specific user list.

Next, processes performed by the email deletion server 15 are explained with reference to the drawings.

A sender transmits an email Mt2 to a specific user (S300). The specific user determination unit 1h extracts (or determines) whether or not the email transmitted by the sender is transmitted for a specific user (S310). The deletion email extraction unit 1b determines whether or not the specific user has already read an email Mt2' (S320). This step may use a situation that a certain time has elapsed after the email transmission as information used for the determination for all the cases. A schedule is created by recoding the specific character string and the date/time at which the deletion is performed in the list of the email Mt2, i.e., the list stored in the database unit 1a. The schedule management unit 1g periodically refers to the list, and when it is the date/time to delete the transmitted email to be deleted, notifies the deletion email extraction unit 1b about that (S330). The subsequent processes are similar to those in the step S240 to S295 in the second exemplary embodiment, and hence shown in FIG. 6.

That is, the email deletion processing unit 1D3 generates a deletion schedule of an email, the deletion of which has been requested, at a specific date/time based on a specific character string in which a sender adds deletion of the email in the content of the email, and updates, for the email server 3, a process for deleting the email from the reception email area of a receiver according to the generated deletion schedule.

As described above, according to the email deletion server 15, it is possible to delete an email Mt2' from the email server 3 when a certain time has elapsed after the email Mt2' becomes an already-read state if the sender transmits the email Mt2 for a specific user even though the sender does not perform any special operation.

Fourth Exemplary Embodiment

In some cases, a sender wants to change the content of a transmitted email including an already-known matter or the like because a schedule is changed after the sender transmitted the email. In such cases, the transmitted email becomes unnecessary. In an email deletion server 20 according to this exemplary embodiment, when there is an updated matter in the main body of an email transmitted by a sender, the transmitted email is updated and the updated transmitted email is registered in the email server 3 again. Further, the original transmitted email is deleted. Further, the same symbols are used for the same parts as those of the first, second and third exemplary embodiments, and the same names are used for parts having the same functions as those of the first and second exemplary embodiments. Further, explanations of duplicated parts are omitted as appropriate.

Figure 9:
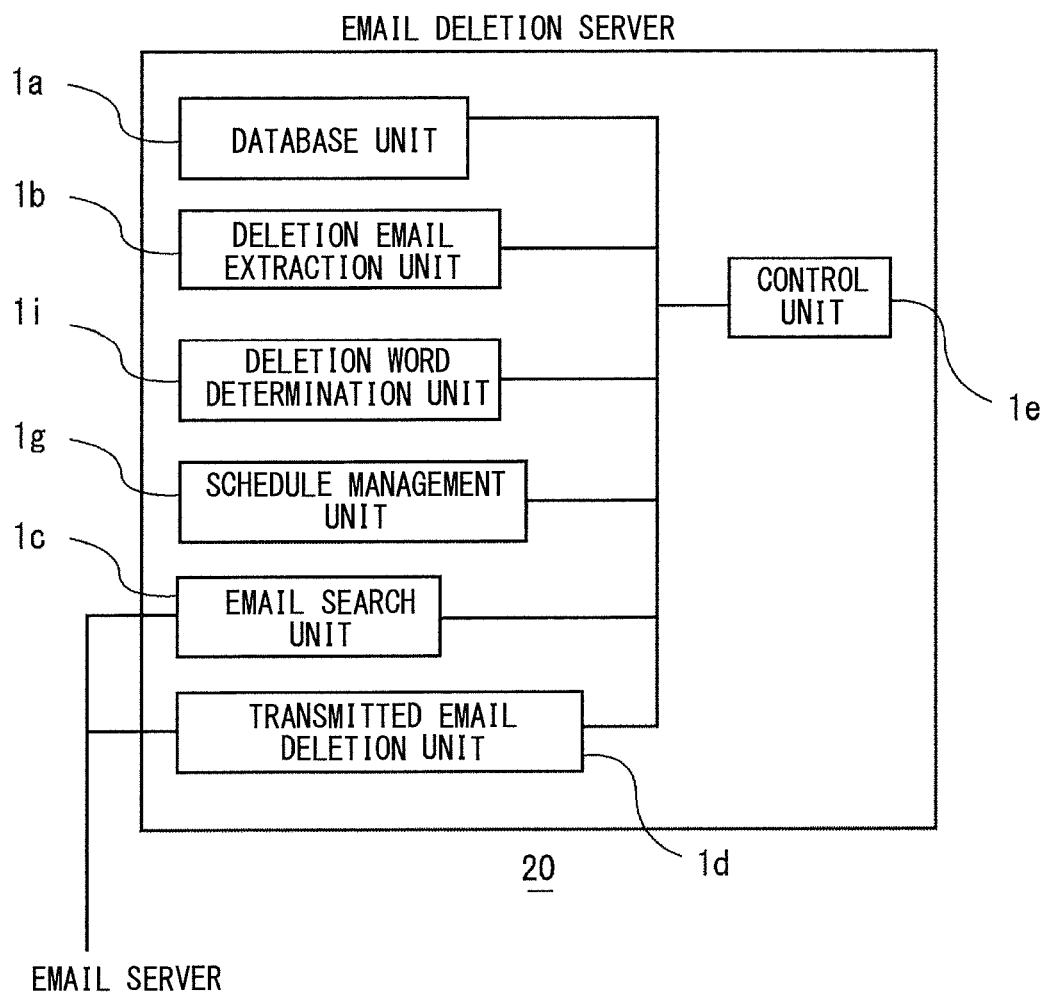
FIG. 9 shows a configuration of an email deletion server according to a fourth exemplary embodiment.

As shown in FIG. 9, the fundamental configuration of the email deletion server 20 is the same as that of the email deletion server 10. In the email deletion server 20, the process performed by a deletion word determination unit 1$i$ is different from that performed in the second exemplary embodiment.

A sender selects a transmitted email Mt3 from a folder for transmitted emails and updates a part of the content of the transmitted email by using a process such as a transfer. Then, the sender adds a character string "#upd" indicating an update in the Subject section. Note that if a sender wants to delete an email after a certain time has elapsed as in the case of the second exemplary embodiment, the sender adds, for example, a character string "upd#del7" or the like. After that, when the sender transmits an update email Mt3$u$, the deletion word determination unit 1$i$ extracts a specific character string indicating updating and deletion. The deletion email extraction unit 1$b$ extracts the transmitted email Mt3 and regards the extracted email as an email to be deleted. The email Mt3$u$ is newly registered in the list stored in the database unit 1$a$. A character string "update" or the like may be automatically added in the Subject section when the update email Mt3$u$ is transmitted. Alternatively, the specific character string may be written in the main body of the email or the email header.

TABLE 4

| Mail ID | Sender | Specific user | Update | Execution date/time | Deletion process | Execution |
|---|---|---|---|---|---|---|
| 1 | x1 | y1, y2, y3 | Yes | Execution | Delete | Not yet |
| 2 | x2 | y5, y6 | No |  | Not |  —  |
| 3 | x1 | y1, y5, y8 | No | In one day | Delete | Not yet |
| 4 | x3 | y2, y9, y10, y11 | No | In seven days | Delete | Done |

As shown in Table 4, it is recorded that the transmitted email Mt3 in the email ID=1 is an email to be updated in the list stored in the database unit 1$a$. Further, "execution" is recorded in an execution date/time section so that the email Mt3 is deleted. When "execution" is recorded, a deletion process of the email Mt3' is performed. Then, the update email Mt3$u$ is newly recorded as a new email in an email ID=4. After that, the deletion process may be performed according to the same schedule as that of the second exemplary embodiment.

The above-described process may be implemented by installing dedicated email client software in the client terminal 4 of a sender and having the sender operate the installed email client software by using a dedicated UI (User Interface) for email updating. As another method, the above-described process may be implemented by providing a Web-page for email updating to a user and having the sender perform an operation on the Web-page. In this case, even when the sender does not perform an operation for adding a specific character string, a specific character string is automatically added in a transmitted email. Further, instead of adding a specific character string, "deletion" and "updating" instructions may be directly sent to the email deletion server 10.

In the email deletion server 20, the deletion email extraction unit 1$b$, the deletion word determination unit 1$i$, the schedule management unit 1$g$, the email search unit 1$c$, and the transmitted email deletion unit 1$d$ constitute an email deletion processing unit 1D4. That is, when an update email Mt3$u$ that is obtained by updating the content of a transmitted email Mt3 is transmitted, the email deletion processing unit 1D4 generates a deletion schedule of an email Mt3' at a specific date/time based on a specific character string in which a sender adds deletion of the email Mt3' in the content of the update email, and updates, for the email server 3, a process for deleting the email Mt3' from the reception email area of a receiver according to the generated deletion schedule.

Next, processes performed by the email deletion server 20 are explained with reference to the drawings.

Figure 10:
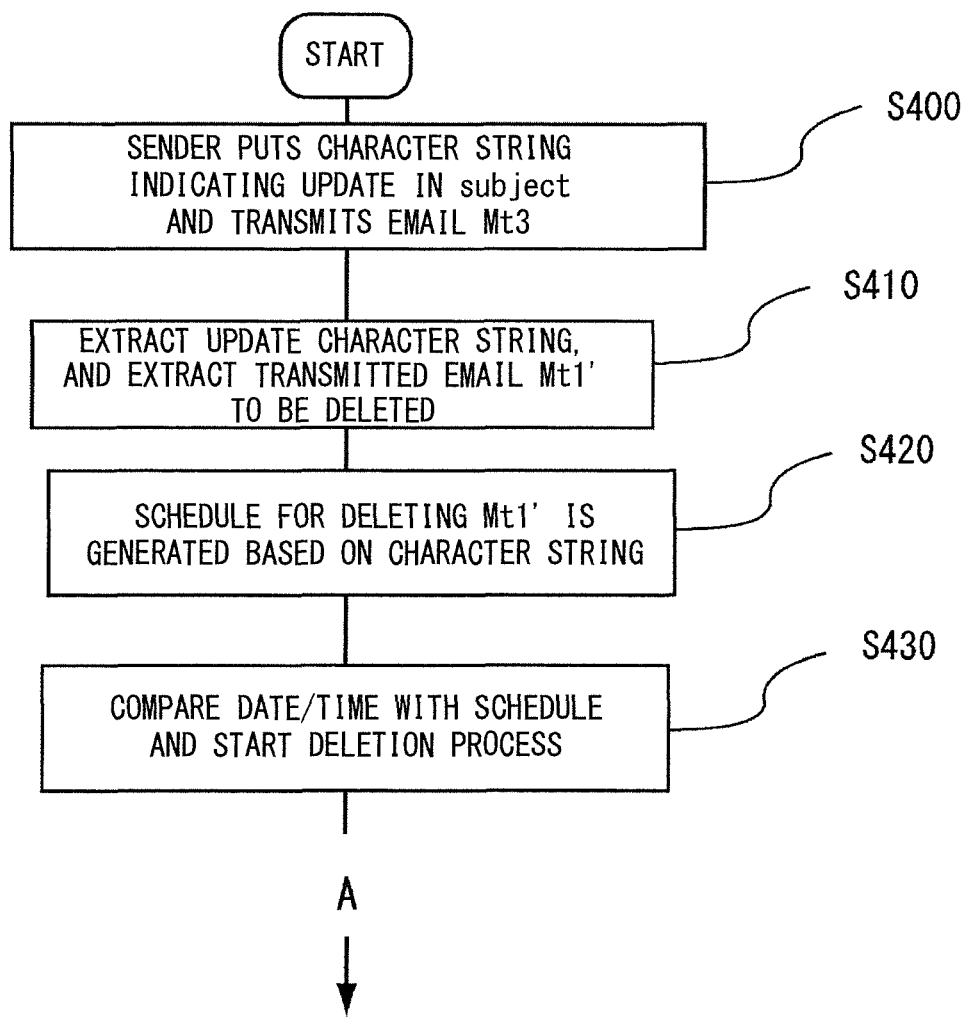
FIG. 10 is a flowchart showing processes performed by an email deletion server.

As shown in FIG. 10, a sender transmits an update email Mt3$u$, which is obtained by updating an email Mt3 by adding a specific character string indicating an update in the content of a transmission email to be transmitted (S400). The deletion word determination unit 1$i$ extracts the specific character string and extracts a transmitted email Mt3' that is to be updated and deleted (S410). A schedule is created by recording whether there is an update or not and a date/time at which deletion is performed in the list of the email Mt3 stored in the database unit 1$a$ (S420). The schedule management unit 1$g$ periodically checks the execution date/time of the process recorded in the list and whether or not the updating and deletion have been already performed. Then, when it is the date/time to delete the email Mt3' to be deleted, the schedule management unit 1$g$ notifies the deletion email extraction unit 1$b$ about that and a deletion process is thereby started (S430). The subsequent processes are similar to those from the step S110 to S180 of the first exemplary embodiment.

As described above, according to the email deletion server 20, after a sender adds a specific character string in the content of an update email that is obtained by updating a transmitted email and transmits the update email, an email received by a receiver corresponding to the transmitted email can be deleted from the email server 3.

Other Exemplary Embodiments

The above-explained email deletion methods may be implemented by using a semiconductor processing apparatus including an ASIC (Application Specific Integrated Circuit). Further, these processes may be implemented by causing a computer system including at least one process (a microprocessor, a MPU, or DSP (Digital Signal Processor)) to execute a program. Specifically, one or a plurality of program including a group of instructions for causing a computer system to execute an algorithm relating to those transmission signal processes or reception signal processes may be created, and this program may be supplied to a computer.

This program can be stored in various types of non-transitory computer readable media and thereby supplied to computers. The non-transitory computer readable media includes various types of tangible storage media.

Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)).

Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Further, the above-described exemplary embodiments are mere examples for the application of the technical idea achieved by the inventors of the present application. That is, needless to say, that technical idea is not limited to the above-described exemplary embodiments and various modifications can be made thereto.

This application is based upon and claims the benefit of priority from Japanese patent application No. 2014-62325, filed on Mar. 25, 2014, the disclosure of which is incorporated herein in its entirety by reference.

REFERENCE SIGNS LIST

1 MAIL DELETION SERVER
1a DATABASE UNIT
1b DELETION MAIL EXTRACTION UNIT
1c MAIL SEARCH UNIT
1d TRANSMITTED MAIL DELETION UNIT
1e CONTROL UNIT
1f, 1i DELETION WORD DETERMINATION UNIT
1g SCHEDULE MANAGEMENT UNIT
1h SPECIFIC USER DETERMINATION UNIT
1D, 1D2, 1D3, 1D4 MAIL DELETION PROCESSING UNIT
2 COMMUNICATION NETWORK
3 MAIL SERVER
4 CLIENT TERMINAL
10 MAIL DELETION SERVER
15 MAIL DELETION SERVER
20 MAIL DELETION SERVER

The invention claimed is:

1. An email deletion server that deletes a transmitted email transmitted from an email server by a sender, the email server being used for a transmission and reception service of an email at least one of transmitted and received by a client terminal, the email deletion server comprising:
a deletion request information storage unit that stores identification information of an email and identification information of at least one receiver of that email, the email being requested to be deleted by a sender; and
an email deletion processing unit that updates, for the email server, a process for deleting an email from a reception email area of the receiver based on the identification information of the email and the identification information of the receiver stored in the deletion request information storage unit, the email being identified by the identification information of the email and the identification information of the receiver,
wherein the email deletion processing unit generates a deletion schedule of the email, deletion of which has been requested, at at least one of a specific date and time, based on a specific character string in which the sender adds deletion of the email in a content of the email, and updates, for the email server, the process of deleting the email from the reception email area of the receiver according to the generated deletion schedule, and
wherein when an update email that is obtained by updating a content of the transmitted email is transmitted, the email deletion processing unit generates a deletion schedule of the email at at least one of a specific date and time based on a specific character string in which the sender adds deletion of the email in a content of the update email, and updates, for the email server, a process of deleting the email from the reception email area of the receiver according to the generated deletion schedule.

2. An email deletion method for deleting a transmitted email transmitted from an email server by a sender, the email server being used for a transmission and reception service of an email at least one of transmitted and received by a client terminal, the email deletion method comprising:
storing identification information of an email and identification information of at least one receiver of that email, the email being requested to be deleted by a sender; and
updating, for the email server, a process for deleting an email from a reception email area of the receiver based on the stored identification information of the email and the stored identification information of the receiver, the email being identified by the identification information of the email and the identification information of the receiver,
wherein a deletion schedule of the email, deletion of which has been requested, is generated at at least one of a specific date and time based on a specific character string in which the sender adds deletion of the email in a content of the email, and the process of deleting the email from the reception email area of the receiver is updated, for the email server, according to the generated deletion schedule, and
wherein when an update email that is obtained by updating a content of the transmitted email is transmitted, a deletion schedule of the email is generated at at least one of a specific date and time based on a specific character string in which the sender adds deletion of the email in a content of the update email, and the process of deleting the email from the reception email area of the receiver is updated, for the email server, according to the generated deletion schedule.

3. A non-transitory computer readable medium storing an email deletion program for causing a computer to execute an email deletion method for deleting a transmitted email transmitted from an email server by a sender, the email server being used for a transmission and reception service of an email at least one of transmitted and received by a client terminal, the email deletion program causing the computer to execute a process comprising:

storing identification information of an email and identification information of at least one receiver of that email, the email being requested to be deleted by a sender; and updating, for the email server, a process for deleting an email from a reception email area of the receiver based on the stored identification information of the email and the stored identification information of the receiver, the email being identified by the identification information of the email and the identification information of the receiver, wherein the email deletion program causes the computer to generate a deletion schedule of the email, the deletion of which has been requested, at at least one of a specific date and time based on a specific character string in which the sender adds deletion of the email in a content of the email, and update, for the email server, the process of deleting the email from the reception email area of the receiver according to the generated deletion schedule, and wherein when an update email that is obtained by updating a content of the transmitted email is transmitted, the email deletion program causes the computer to generate a deletion schedule of the email at at least one of a specific date and time based on a specific character string in which the sender adds deletion of the email in a content of the update email, and update, for the email server, a process of deleting the email from the reception email area of the receiver according to the generated deletion schedule.

* * * * *